March 18, 1930.  J. GRANT  1,751,082
ACCOUNTING DEVICE
Filed June 4, 1928   2 Sheets-Sheet 1

INVENTOR

March 18, 1930.  J. GRANT  1,751,082

ACCOUNTING DEVICE

Filed June 4, 1928  2 Sheets-Sheet 2

Patented Mar. 18, 1930

1,751,082

UNITED STATES PATENT OFFICE

JAMES GRANT, OF BEN AVON HEIGHTS, PENNSYLVANIA

ACCOUNTING DEVICE

Application filed June 4, 1928. Serial No. 282,704.

My invention is intended and arranged for use in the explanation of and instruction in the principles of accounting, and more especially those of double-entry bookkeeping, and it may also be used as an educational game.

A characteristic feature of my invention is the employment of spherical pellets which are caused to change their positions by the movement of the surface or surfaces upon which they are placed and thus indicate by their various locations different items of accounting which are marked on such surface or surfaces.

Figure 1:
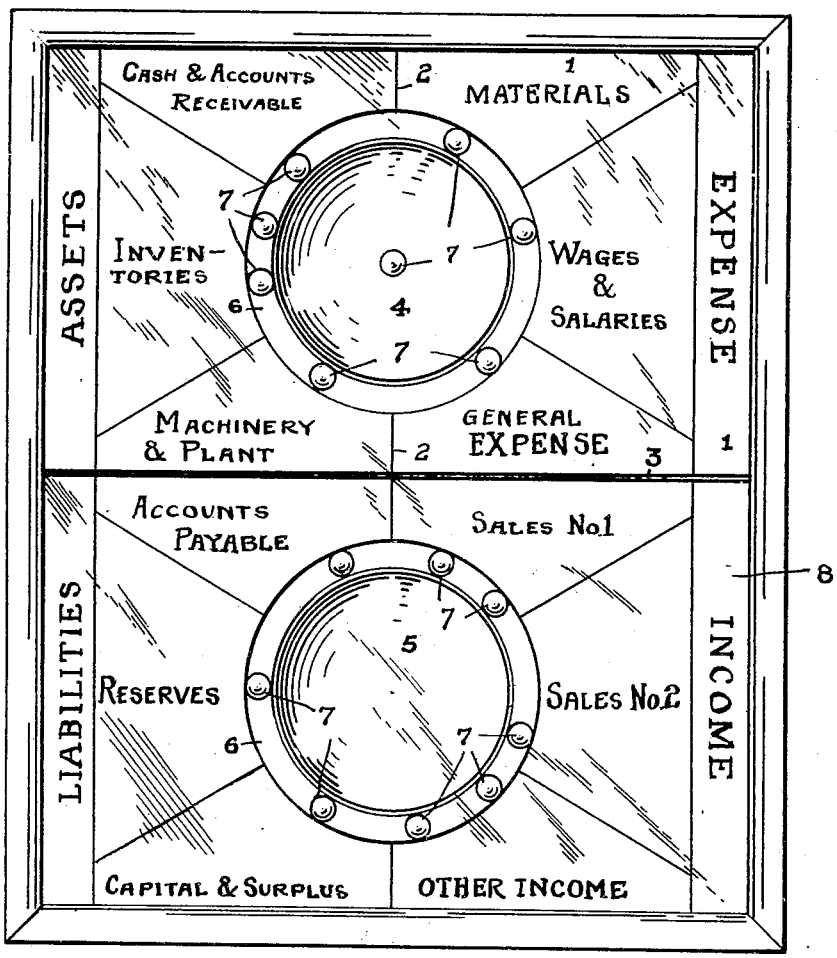
Figure 2:
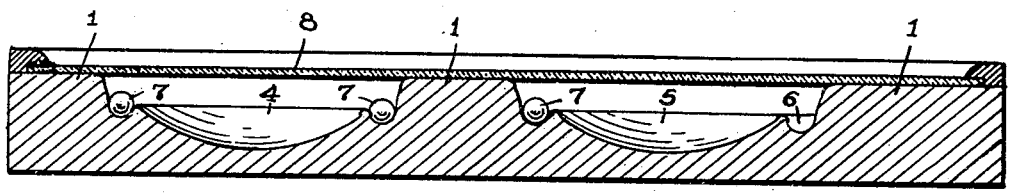

In the accompanying drawings wherein I have illustrated the practical embodiment of the principles of my invention, Fig. 1 is a plan view of one form of my device, and Fig. 2 is a longitudinal section of the same.

Figure 3:
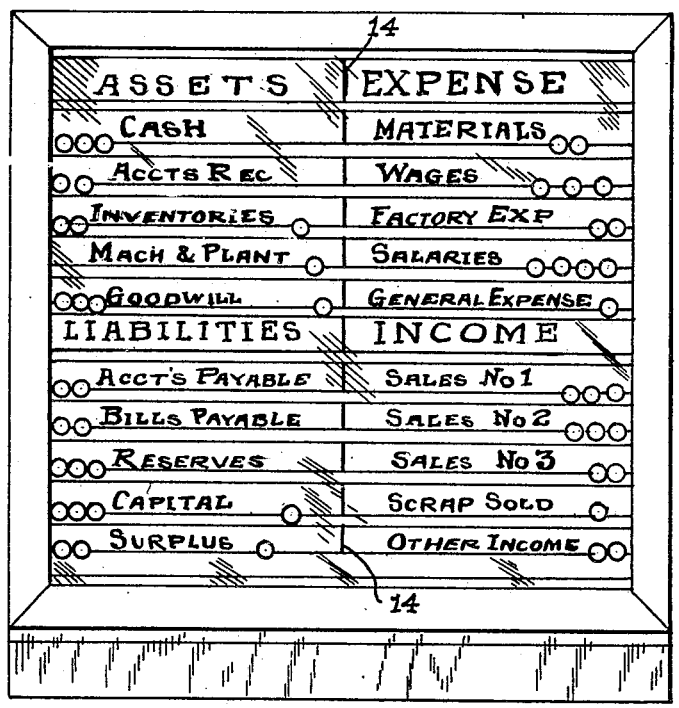
Figure 4:
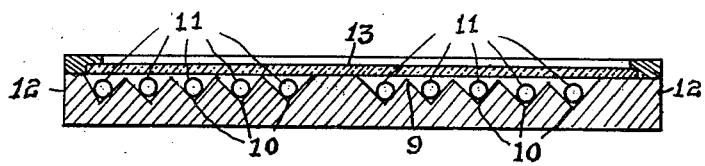

Fig. 3 is a view of the second form of my device, the same being in a plane inclined downwardly toward the upper end of the figure, and Fig. 4 is a longitudinal section of the same.

Referring first to Figs. 1 and 2 of the drawings, 1 represents a generally flat supporting surface which may be of wood or any other convenient material. The longitudinal axis of the surface of the plate 1 is indicated by the line 2 and its transverse axis by the line 3.

Arranged on the longitudinal axis above and below the transverse axis and symmetrically placed relative to the transverse axis and the ends of the surface are a pair of circular sunken recesses or bowls 4 and 5, the same being perimetrally defined by shallow annular troughs 6.

The top left hand quarter of the surface of the plate 1 is devoted to the general subject matter of assets and marked off into subdivisions to denote various characters of assets, such as cash and accounts receivable; inventories, and machinery and plant. The right hand upper quarter is devoted to the general subject matter of expense, and is marked off into subdivisions to denote various characters of expense, such as materials; wages and salaries; and general expense.

The lower left hand quarter is devoted to the general subject matter of liabilities, and is marked off into subdivisions to denote various characters of liabilities such as accounts payable; reserves, and capital and surplus.

The lower right quarter is devoted to the general subject matter of income and is marked off into subdivisions to denote various characters of income such as sales No. 1, sales No. 2 and other income.

The subdivisions extend inwardly to the annular troughs 6 surrounding the bowls and may be further divided or marked into tenths indicating further subdivision as in ordinary "controlled" accounts.

Inasmuch as the basic principle of double-entry bookkeeping is a credit for every debit and vice versa, an equal number, such as eight, of spherical pellets 7, which may be shot, are placed in each bowl.

If desired a larger number of pellets may be placed in the upper bowl and the capital and surplus or excess assets indicated by the difference in number.

The surface 1 is covered by a glass 8 which prevents the pellets escaping from the bowls beyond the troughs 6.

As all the balance sheet items are indicated at one side of the longitudinal axis of the plate 1, assets above and liabilities below, and all the profit and loss items on the other side of said axis, expenses above and income below, if the plate be tipped to the left in Fig. 1 the pellets will be caused to travel into positions in the troughs 6 to indicate a balance sheet since the debit pellets and the credit pellets are equal in number.

Again if the plate 1 be tipped toward the right in Fig. 1, the pellets will move into position to indicate a profit and loss account—expenses and income—which will also be equal, or showing neither profit nor loss.

Again, to indicate various relative proportions of assets to liabilities, and of expense to income, as a whole or by individual units or subdivisions, the plate is held in a horizontal position, preferably with the pellets first in the bowl, and a rotary motion imparted thereto, causing the pellets to move into or in the annular troughs and thus indicate by their changed positions corresponding changes in assets and liabilities, and expense and income, illustrating the fundamental principle in accounting that in working from a trial balance the difference shown between assets and liabilities is equal to the difference between income and expense which is the gain or loss, as the case may be.

Any pellets coming to rest in the center of the bowls will indicate what in accounting is termed a "difference" which, for the purpose of practice, may be treated either as balance sheet items or as profit and loss items.

With the pellets arranged relative to the upper and lower bowls as shown on Fig. 1, there is indicated a surplus of assets over liabilities by one; showing that the original capital and surplus of one (100; 1000, or 100,000, as the unit may be) the gain on manufacturing or trading is one hundred per cent. This is substantiated or proven by a reading of the pellets on the right hand of the longitudinal axis of the figure, which shows five pellets denoting income and three denoting expense with a fourth in the center of the bowl, in this case indicated as expense—or a net income of one—evenly balancing the gain shown "per contra" by the excess of assets. As elsewhere stated the excess of assets indicated over liabilities must be the difference on the income side in excess of expense, subject to any pellets remaining in the bowls which in that event will indicate the accounting "differences" or bookkeeping error.

Referring now to Figs. 3 and 4, the device shown therein is developed in the form of a rectangular floor 9 characterized by transversely disposed channels or troughs 10 in which are placed an equal number of spherical pellets 11. The floor is surrounded by the side and end walls 12 and preferably covered by a glass 13 which fits low enough to prevent the pellets from escaping from one trough to another.

As in the case of the embodiment illustrated in Figs. 1 and 2, the floor is divided by a line 14 which forms its longitudinal axis.

The upper half of the floor indicates assets and expenses.

The upper left hand quarter of the floor in Fig. 3 is headed or marked generally to indicate assets and the individual troughs are marked to indicate various characters of assets, such as cash; accounts receivable; inventories; machinery and plant, and goodwill.

The upper right quarter in Fig. 3 is headed or marked to generally indicate expense and the individual troughs are marked to indicate various characters of expense, such as materials, wages, factory expenses, salaries, and general expense.

The lower half of the floor in Fig. 3 is employed to indicate liabilities and income.

The left lower quarter is marked or headed liabilities while the individual troughs are marked to indicate various characters of liabilities, such as accounts payable; bills payable; reserves; capital, and surplus.

The lower right hand quarter of the floor is marked or headed income and the individual troughs are marked to indicate various characters of income, such as sales No. 1; sales No. 2; scrap sold, and other income.

It is evident the main divisions and the individual troughs may be marked for accounting in any particular class of business, giving a range of usefulness to the device and also of practice to a student of accounting.

The device is used by tilting the floor to one side or the other, thus causing more or less of the pellets, depending upon the violence of the tilting and the inertia of the pellets, to travel from one side of the floor to the other.

Thereupon the assets and liabilities, and the various items of the same may be read by noting the pellets at the left side of the longitudinal axis, and the expense and income, and the various items of the same may be read by noting the pellets at the right side of said axis.

The reading of the device as shown in Fig. 3 is as follows:—

Assets 13 pellets, subdivided as follows—cash 3; accounts receivable 2; inventories 3; machinery and plant 1, and goodwill 4. Liabilities 14, subdivided as follows—accounts payable 2; bills payable 2; reserves 3; capital 4, and surplus 3.

It is thus apparent that the liabilities exceed the assets by 1, representing a loss as shown per contra by the excess of expenses over income as follows:—

Expense 12, subdivided as follows—materials 2; wages 3; factory expense 2; salaries 4, and general expense 1. Income 11, subdivided as follows—sales No. 1, 3; sales No. 2, 3; sales No. 3, 2; scrap sold 1, and other income 2.

Thus it is indicated that the original capital and surplus (in this case surplus) is diminished by 1 (100 or 1000 or whatever denomination is alloted).

It is evident from the foregoing that the fundamental principles of double-entry bookkeeping may thus be readily studied and understood by means of my invention. The device may also be used as an instructive and pleasurable game. It may also be used in testing the principles of addition and subtraction which of course are involved in accounting and bookkeeping.

Again in the set up of the two bowls with the movable pellets, the periphery of the bowls being sectionally divided and representing contrasting classes or characters relating to any given subject matter, and the pellets by their various relative positions denoting different relationships, it is possible to employ the device in playing various games or exercises of skill and chance involving the principle of permutation.

What I desire to claim is:—

1. An accounting instruction device provided with a surface marked in divisions to denote various classes of accounting items and pellets arranged to be moved thereon to indicate various items, the pellets being caused to move through the force of gravity by tipping the device.

2. An accounting instruction device provided with a surface having one portion marked to denote classes of accounting items of one character and another portion to indicate items of accounting of another character, and pellets arranged to travel relative to said surface from one portion thereof to the other to indicate various items, the pellets being caused to move through the force of gravity by tipping the device.

3. An accounting instruction device provided with a surface divided into four divisions denoting respectively, assets, expenses, liabilities and income, a plurality of pellets movable in relation to the assets and expenses divisions and a like number of pellets movable in the liabilities and income divisions for the purpose described, the pellets being caused to move through the force of gravity by tipping the device.

4. An accounting instruction device provided with a surface divided into four grand divisions denoting respectively, assets, expenses, liabilities and income, and each of said grand divisions being subdivided to denote various characters thereof, a plurality of pellets movable in relation to the assets and expenses divisions and a like number movable in relation to the liabilities and income divisions for the purpose described, the pellets being caused to move through the force of gravity by tipping the device.

5. An accounting instruction device provided with a surface characterized by transversely disposed troughs, the trough portions at one side of the medial line denoting one character of items of accounting while the portions at the other side of said medial line denoting contrasting items of accounting, and a plurality of pellets in each of said troughs and movable along the same to indicate by their positions various items.

6. An accounting instruction device provided with a surface characterized by transversely disposed troughs, the portions of the trough on one side of the medial line indicating various items of accounting grouped under a general heading such as assets while the portions of the trough on the other side of the medial line indicating various items of accounting grouped under another general heading such as expense, and pellets movable in said troughs and by their positions indicating various items.

7. An accounting instruction device provided with a surface characterized by transversely disposed troughs, the portions of certain contiguous troughs denoting at one side of the medial line items of assets while the portions of the same troughs at the other side of the medial line denoting items of expense, and the portions of the remaining troughs which are at one side of the medial line denoting items of liabilities and at the other side of said medial line items of income, and pellets movable in said troughs and by their positions indicating various of said items.

8. An accounting instruction device provided with a surface divided into four divisions denoting respectively, assets, expenses, liabilities and income, and a plurality of pellets movable in relation to the assets and expenses, and an equal number of pellets movable in relation to liabilities and income, the pellets being caused to change their positions by the movement of the surface, and the relative arrangement of the divisions being such that the difference between the number of pellets denoting assets and liabilities is the same as the difference between the pellets denoting expense and income.

Signed at Pittsburgh, Pa., this 1st day of June, 1928.

JAMES GRANT.